J. A. VANN.
REVERSIBLE PLOW-HOOKS.

No. 194,276. Patented Aug. 14, 1877.

UNITED STATES PATENT OFFICE.

JOHN A. VANN, OF BELVIDERE, NORTH CAROLINA.

IMPROVEMENT IN REVERSIBLE PLOW-HOOKS.

Specification forming part of Letters Patent No. 194,276, dated August 14, 1877; application filed June 25, 1877.

*To all whom it may concern:*

Figure 1:
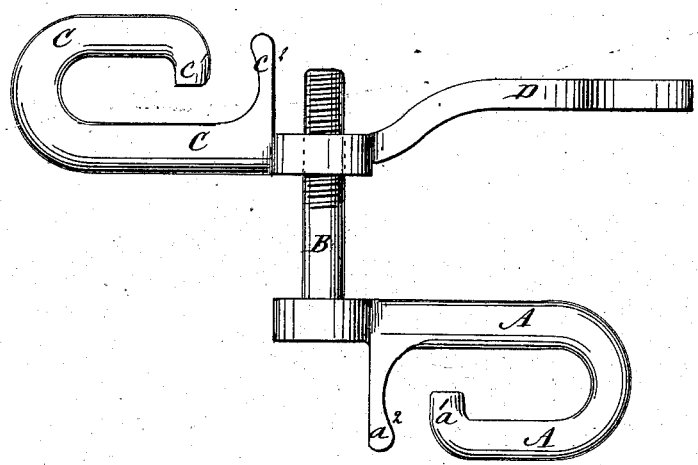
Figure 2:
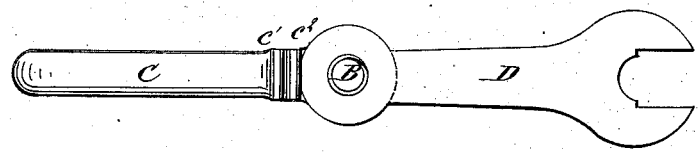

Be it known that I, JOHN A. VANN, of Belvidere, in the county of Perquimons and State of North Carolina, have invented a new and useful Improvement in Reversible Plow-Hook, of which the following is a specification:

Figure 1 is a side view of my improved reversible plow-hook. Fig. 2 is a top view of the same.

Similar letters of reference indicate corresponding parts.

The object of this invention is to furnish an improved plow-hook to take the place of the ordinary plow-clevis, which shall be simple in construction, easily adjusted to cause the plow to run deeper or shallower in the ground, strong and durable, and which, when one of the hooks becomes worn, may be reversed and the other hook used, enabling the hook to be used twice as long as a single hook or an ordinary clevis.

The invention consists in a double or reversible draft-hook, constructed and applied as will be hereinafter more fully described, and then set forth in the claim.

A is a hook, upon the shank of which is formed, or to it is rigidly attached, a bolt, B, of sufficient length to pass through a plow-beam, and which has a screw-thread cut upon its upper end.

C is a second hook, similar to the hook A, but which has a screw-hole formed in its shank to receive and fit upon the screw-thread of the bolt B.

The ends of the hooks A C are bent inward to form straps $a^1 c^1$, to prevent the staple of the double-tree or whiffletree from dropping out.

To still further prevent the staple of the double-tree or whiffletree from dropping out, stops $a^2 c^2$ are formed upon the shanks of the hooks A C, which project past the points of the said hooks, as shown in Fig. 1.

Upon the shank of the nut-hook C is formed a wrench, D, of such a size as to grasp and turn the nuts or bolts of the plow, so that the plowman may have always at hand a wrench that will enable him to make any required adjustments of his plow.

The draft is usually applied to the lower hook A, and several holes are formed in the plow-beam to receive the bolt B, so that the point of draft attachment may be moved forward or backward upon said beam, according as it is desired to have the plow work deeper or shallower in the ground.

If it is desired to have the plow work still deeper in the ground, the lower hook A may be turned back, and the upper hook C turned forward, so that the draft may be applied to the said hook C.

With this construction, when one of the hooks becomes worn the device may be reversed and the other hook used, so that the device will last twice as long as an ordinary draft-hook or clevis.

Having thus described my invention, I claim as new and desire to secure by Letters Patent—

The reversible draft-hook for plows, consisting of the bottom hook A, having the screw-shank B and stops $a^1 a^2$, and the top hook C, having the stops $c^1 c^2$, and a screw-opening, substantially as herein shown and described.

JOHN A. VANN.

Witnesses:
J. ROBERT PARKER,
H. H. WILLIAMS.